United States Patent
Kim (10) Patent No.: US 9,637,170 B2
(45) Date of Patent: May 2, 2017

(54) STEERING TORQUE COMPENSATING APPARATUS AND STEERING TORQUE COMPENSATING METHOD

(71) Applicant: MANDO CORPORATION, Pyeongtaek-si, Gyeonggi-do (KR)

(72) Inventor: Soon Tae Kim, Yongin-si (KR)

(73) Assignee: MANDO CORPORATION, Pyeongtaek-si, Gyeonggi-Do (KR)

( * ) Notice: Subject to any disclaimer, the term of this patent is extended or adjusted under 35 U.S.C. 154(b) by 0 days.

(21) Appl. No.: 14/963,140

(22) Filed: Dec. 8, 2015

(65) Prior Publication Data
US 2016/0159395 A1  Jun. 9, 2016

(30) Foreign Application Priority Data
Dec. 9, 2014  (KR) .......... 10-2014-0175588

(51) Int. Cl.
*B62D 15/02* (2006.01)
*B62D 5/04* (2006.01)

(52) U.S. Cl.
CPC ......... *B62D 15/025* (2013.01); *B62D 5/0463* (2013.01)

(58) Field of Classification Search
CPC .............................. B62D 15/025; B62D 5/0463
See application file for complete search history.

(56) References Cited

U.S. PATENT DOCUMENTS

| | | | |
|---|---|---|---|
| 6,112,845 A | 9/2000 | Oyama et al. | |
| 2014/0188345 A1* | 7/2014 | Tamura | B62D 15/025 701/42 |

FOREIGN PATENT DOCUMENTS

| | | |
|---|---|---|
| DE | 102007043419 A1 | 3/2008 |
| DE | 102012218534 A1 | 5/2013 |
| EP | 2837538 A1 | 2/2015 |
| WO | 2014/105441 A1 | 7/2014 |

OTHER PUBLICATIONS

German Office Action for corresponding German Patent Application No. 102015015681.0 dated Feb. 3, 2017.

* cited by examiner

*Primary Examiner* — Michael D Lang
(74) *Attorney, Agent, or Firm* — Hauptman Ham, LLP

(57) ABSTRACT

The present invention relates to a technology of compensating for steering torque. More particularly, the present invention provides a steering torque compensating apparatus including: a reference object recognition unit that recognizes a fixed reference object arranged in correspondence to a lane of a road by using a camera of a vehicle; a distance measurement unit that measures a distance difference between the vehicle and the fixed reference object; and an operation determination unit that calculates a distance change rate that is a change rate of the distance difference per time and determines whether the vehicle is driven forwards or rearwards, by using the distance change rate, and a steering torque compensating method.

9 Claims, 8 Drawing Sheets

STEERING TORQUE COMPENSATING APPARATUS AND STEERING TORQUE COMPENSATING METHOD

CROSS-REFERENCE TO RELATED APPLICATION

This application claims priority from and the benefit under 35 U.S.C. §119(a) of Korean Patent Application No. 10-2014-0175588, filed on Dec. 9, 2014, which is hereby incorporated by reference for all purposes as if fully set forth herein.

BACKGROUND OF THE INVENTION

1. Field of the invention

The present invention relates to an electronic control unit and a method for compensating for a torque steer. The present invention relates to a technology of compensating for steering torque. More particularly, it relates to a technology of recognizing whether a vehicle is driven forwards or rearwards by using a distance difference between the vehicle and a reference object and then compensating for steering torque on the basis of the recognition.

2. Description of the Prior Art

The present invention relates to a lane keeping assist system (LKAS) for preventing deviation of a vehicle from a lane of a road that may occur due to carelessness or drowsiness of the driver in the vehicle.

Because the existing lane keeping assist system is operated depending on an angle of the forward direction of the vehicle, there is a limit in that the direction of a steering assisting torque is determined by the forward direction of the vehicle.

In order to supplement the limit, the forward or rearward driving of the vehicle is determined by recognizing the direction of a yaw rate due to the steering wheel of the vehicle, but it is difficult to determine whether the vehicle is driven forwards or rearwards in a forward or rearward driving state in which little steering of the steering wheel is made.

Furthermore, it may be identified whether the vehicle is driven forwards or rearwards on the basis of the gear position of the transmission of the vehicle, but when the vehicle is driven on a downhill road in a neutral gear or temporarily slid to be driven rearwards on an uphill road even in a forward gear D, it is difficult to fully recognize the forward or rearward driving state of the vehicle only with the gear state of the transmission.

Meanwhile, because the existing lane keeping assist system automatically applies an auxiliary steering force regardless of the steering intention of the driver with the assumption that the vehicle is driven forwards, it may generate a steering assisting torque and endanger the driver of the vehicle by the generated steering assisting torque while determining that the vehicle is driven forwards if the vehicle is driven rearwards due to a carelessness of the driver while the lane keeping assist system is turned on.

SUMMARY OF THE INVENTION

In this background, the present invention provides a steering torque compensating apparatus that can determine whether a vehicle is driven forwards or rearwards only by using a camera unit, and a steering torque compensating method.

The present invention also provides a steering torque compensating apparatus that identifies whether a vehicle is driven forwards or rearwards only by using a camera unit and provides a steering assisting torque suitable for the forward or rearward operation of the vehicle in a situation in which the lane keeping assist system is operated, and a steering torque compensating method.

In accordance with an aspect of the present invention, there is provided a steering torque compensating apparatus including: a reference object recognition unit that recognizes a fixed reference object arranged in correspondence to a lane of a road by using a camera of a vehicle; a distance measurement unit that measures a distance difference between the vehicle and the fixed reference object; and an operation determination unit that calculates a distance change rate that is a change rate of the distance difference per time and determines whether the vehicle is driven forwards or rearwards, by using the distance change rate.

In accordance with another aspect of the present invention, there is provided a steering torque compensating method including: recognizing a fixed reference object arranged in correspondence to a lane of a road by using a camera of a vehicle; measuring a distance difference between the vehicle and the fixed reference object; and calculating a distance change rate that is a change rate of the distance difference per time and determining whether the vehicle is driven forwards or rearwards, by using the distance change rate.

As described above, according to the present invention, deviation of a vehicle from a lane can be prevented by determining whether a vehicle operated by a lane keeping assist system is moved forwards or rearwards by using an imaging device and providing a steering assisting torque suitable for the forward or rearward operation of the vehicle.

BRIEF DESCRIPTION OF THE DRAWINGS

The above and other objects, features, and advantages of the present invention will be more apparent from the following detailed description taken in conjunction with the accompanying drawings, in which.

DETAILED DESCRIPTION OF THE EXEMPLARY EMBODIMENTS

Hereinafter, exemplary embodiments of the present invention will be described in detail with reference to the accompanying drawings. In the description of the elements of the present invention, terms "first", "second", "A", "B", "(a)", "(b)" and the like may be used. These terms are merely used to distinguish one structural element from other structural elements, and a property, an order, a sequence and the like of a corresponding structural element are not limited by the term. It should be noted that if it is described in the specification that one component is "connected," "coupled" or "joined" to another component, a third component may be "connected," "coupled," and "joined" between the first and second components, although the first component may be directly connected, coupled or joined to the second component.

Figure 1:
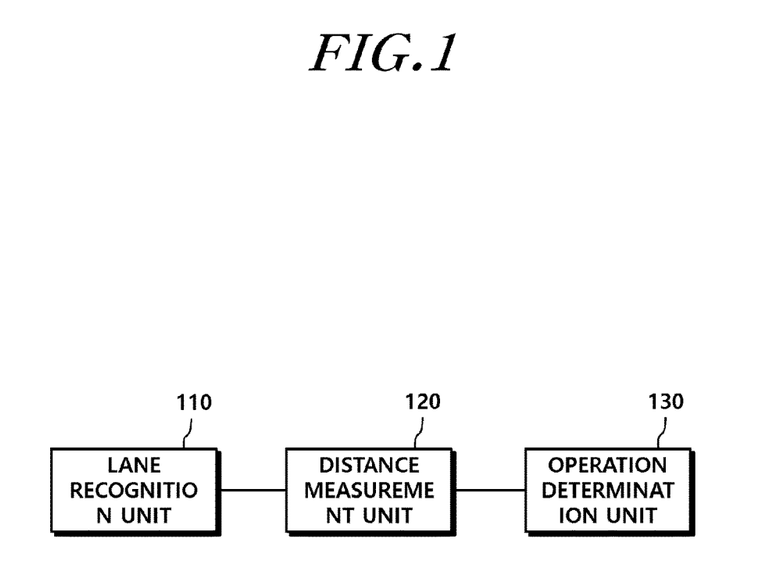
FIG. 1 is a block diagram illustrating a configuration of a steering torque compensating apparatus according to an embodiment of the present invention.

FIG. 1 is a block diagram illustrating a configuration of a steering torque compensating apparatus according to an embodiment of the present invention.

The steering torque compensating apparatus according to an embodiment of the present invention may include: a reference object recognition unit that recognizes a fixed reference object, such as a line of a lane, a median strip, or a guardrail, by using a camera of a vehicle; a distance measurement unit that measures a distance difference between the vehicle and the fixed reference object; and an operation determination unit that calculates a distance change rate that is a change rate of the distance difference per time and determines whether the vehicle is driven forwards or rearwards, by using the distance change rate In the specification, the fixed reference object used to determine whether the vehicle is driven forwards or rearwards is a concept including all fixed structures or displayed objects, such as a line of a lane, a median strip, and a guard rail, which are continuously arranged along a road.

That is, according to the present invention, a distance (difference) between a fixed reference object arranged in the same direction as the progress direction of the road and a vehicle is measured, and it is determined whether the vehicle is driven forwards or rearwards according to the sign of a change rate of the distance difference.

For convenience, a line of a lane will be exemplified as an example of the fixed reference object in the following description but the present invention is not limited thereto.

Referring to FIG. 1, a steering torque compensating apparatus according to the present invention may include a lane recognition unit 110 that recognizes a lane of a road as a fixed reference object by using a camera of the vehicle.

That is, a lane recognition unit as an example of a reference object recognition unit that is an element of the present invention will be described below as a representative.

As an example, the lane recognition unit 110 may recognize the centerline, the first line, and the second line on a road. In detail, the lines of a road may be recognized by using color information of the lines and line information. The centerline of the road is indicated by yellow, and the first line and the second line are indicated by white. Furthermore, the lines of the road have a uniform width of 15 cm. Accordingly, if the camera of the vehicle detects a yellow line of a width of 15 cm, a centerline may be recognized, and if white lines of a width of 15 cm are detected, the first line and the second line may be recognized. Furthermore, the first line and the second line may be distinguished with reference to the recognized centerline. The present invention may be implemented even without distinguishing the centerline, the first line, and the second line, but the lines that the front side of the vehicle faces will be referenced for convenience of understanding.

According to the present invention, the line that functions as a reference for measuring a distance difference is determined by one of the left line and the right line located on opposite sides of a lane, and a heading angle of the vehicle may be used in the determination.

The heading angle of the vehicle may be defined as an angle formed by the forward direction of the lane and the lengthwise direction of the vehicle, and the heading angle may be a value that is output by a camera module of the vehicle.

In more detail, the camera module may calculate the heading angle of the vehicle by comparing a vanishing point that is a virtual point where opposite lines of the current lane meet in the photographed front image with the central location of the photographed image, and may output the heading angle.

A distance measurement unit 120, which will be described below, selects one of the opposite lines of the current lane based on the heading angle, and measures a distance (difference) between the corresponding line and the vehicle.

For example, when the vehicle heads to the right from the forward direction of the lane, the heading angle may be defined as being positive (+), while when the vehicle heads to the left, the heading angle may be defined as being negative (−), and if the heading angle has a positive value, the distance difference from the vehicle is measured with reference to the right line of the lane, while if the heading angle has a negative value, the distance difference from the vehicle is measured with reference to the left line of the lane.

The steering torque compensating apparatus may include a distance measurement unit 120 that measures a distance difference between the vehicle and a line of a lane.

As an example, the distance measurement unit 120 may measure a distance difference between the recognized line and the vehicle. Although the location (for example, the front part, the middle part, or the rear part) of the measured vehicle is not important in the present invention, the location of the vehicle is limited to the middle part of the vehicle for convenience in the following description, and the distance difference may be the shortest distance between the middle part of the vehicle and the line of the lane.

In a description of the shortest distance, if the distance between the middle part of the vehicle and the line of the lane is continuously measured from the distant side towards the close side (for example, from the rear side towards the front side or from the front side towards the rear side), the measured distance becomes shorter and then becomes longer without becoming shorter any more at a certain point, and the shortest distance is the distance between the point and the vehicle and may be a distance difference between the vehicle and the line of the lane. Here, in a brief description of a method of measuring a distance by using a camera, the distance may be measured by comparing the distance with a specific location that has already been known. For example, if location A (for example, a continuous location in two-dimensions) spaced apart from the camera by a distance of 1 m is known, the distance of another location B may be measured by using the relationship between the camera, location A, and location B. In the example, if location B is situated directly at the center of the camera and location A, it can be seen that the distance of location B is 0.5 m. That is, the distance between the camera and location B is obtained with reference to the distance between the camera and location A. Meanwhile, when only one camera is used to measure the distance, only an arbitrary location C that has a one or two-dimensional relationship with the camera and location A may be known, and a distance of location D that has a three-dimensional relationship cannot be measured. However, if two cameras or one camera and another device are used, the distance of location D that has a three-dimensional relationship may be measured.

The steering torque compensating apparatus may include an operation determination unit 130 that calculates a distance change rate that is a change rate of the distance difference per time and determines a forward or rearward operation of the vehicle by using the distance change rate.

As an example, the distance change rate may be obtained by using Equation 1.

$$\frac{dY}{dt} = \frac{Y_1 - Y_0}{t_1 - t_0} \qquad \text{Equation 1}$$

dt: time period for which the vehicle moves, t1: time after the vehicle moves, t0: time before the vehicle moves, dY: distance difference value according to the movement of the vehicle, Y1: distance difference when time is t1, and Y2: distance difference when time is t0

In Equation 1, the vehicle, the front side of which heads to the right line of the lane, moves forwards for a time period of t0 to t1, Y1 is smaller than Y0 and the distance change rate is a negative value. If the vehicle, the front side of which heads to the right line of the lane, moves rearwards for a time period of t0 to t1, Y1 is larger than Y0 and the distance change rate is a positive value. The distance change rate has the same distance change rate even for the vehicle, the front side of which heads to the left line of the lane.

Furthermore, the operation determination unit 130 may continuously calculate the distance change rate for a predetermined time period after a forward or rearward operation of the vehicle. An error in determining a forward or rearward operation of the vehicle can be prevented with reference to the continuously calculated distance change rate, and a danger that may be caused by a wrong determination of a forward or rearward operation can be reduced. For example, if the operation determination unit 130 continuously calculates the distance change rate twice and all the calculated values are negative values, there is no error in determining that the vehicle is driven forwards. However, if the distance change rates that are continuously calculated twice by the operation determination unit 130 are a negative number and a positive number, respectively, it may be determined that the vehicle is driven forwards and rearwards. However, because this situation is impossible in a continuous calculation, it is determined that there is an error in calculating the distance change rates or an error is generated in the operations of the lane recognition unit 110 and the distance measurement unit 120 so that the operation determination unit 130 cannot determine an operation of the vehicle. This is because the continuous calculation is faster than the operation change of the vehicle.

If the longitudinal speed measured by using a speed sensor of the vehicle is zero, the operation determination unit 130 may determine a forward or rearward operation of the vehicle again.

This is because the vehicle operated forwards or rearwards at a longitudinal speed cannot change a forward operation to a rearward operation or a rearward operation to a forward operation unless the longitudinal speed of the vehicle becomes zero. If the operation determination unit 130 calculates a distance change rate and recognizes an operation of the vehicle by using the aspect, the proceeding direction of the vehicle is not determined anymore because the proceeding directions of the vehicle are the same as long as the longitudinal speed of the vehicle does not become zero. This is also because the calculation of the distance change rate of the operation determination unit 130 is faster than an operation change of the vehicle.

Figure 2:
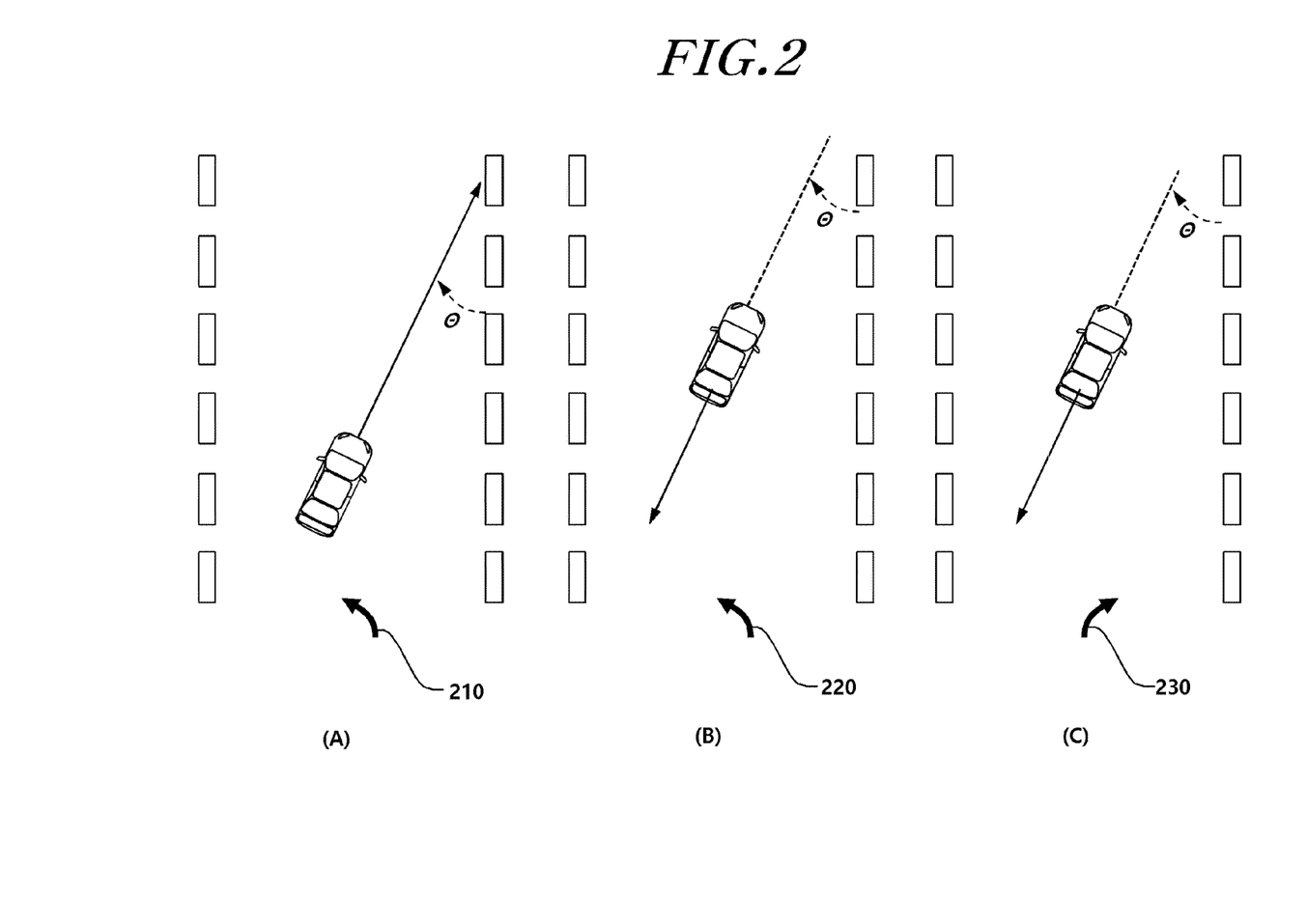
FIG. 2 is a view illustrating an example for explaining an operation of a steering torque compensating apparatus according to the present invention.

FIG. 2 is a view illustrating an example for explaining an operation of a steering torque compensating apparatus according to the present invention.

Referring to FIG. 2, all of vehicles A, B, and C head to the right side lines and the forward directions of the vehicles and the right lines form an angle of θ. That is, all the heading angles of vehicles A, B, and C are positive values, and then the heading angles and the above-mentioned angle θ are the same value.

However, vehicle A moves forwards, and the steering apparatus is operated at a target torque by using an existing steering torque apparatus, vehicle B moves rearwards, and the steering apparatus is operated at a target torque by using an existing steering torque apparatus, and vehicle C moves rearwards, and the steering apparatus is operated with a magnitude of a target torque by using a torque apparatus but in an opposite direction of the target torque.

Here, a target torque refers to a steering assisting torque that makes the vehicle parallel to a line of a road, and is a steering assisting torque that depends on a side toward which the front side of the vehicle heads. For example, if the front side of the vehicle heads to the right line, the steering assisting torque has a direction by which the steering apparatus is operated in the counterclockwise direction and a magnitude that is proportional to the angle of θ, while if the front side of the vehicle heads to the right line, the steering assisting torque has a direction by which the steering apparatus is operated in the clockwise direction and has a magnitude that is proportional to the angle of θ'. θ' denotes an angle formed by the forward direction of the vehicle and the left line of the lane.

Accordingly, if vehicle A of FIG. 2 uses an existing steering torque apparatus, the steering apparatus is operated in the counterclockwise direction 210 and a danger of vehicle A crossing the line does not occur. However, if vehicle B uses an existing steering torque apparatus, the steering apparatus is operated in the counterclockwise direction 220 and a danger of vehicle B crossing the left line while moving rearwards may occur. That is, although the steering apparatus of vehicle B should be operated in the clockwise direction ideally unlike the steering apparatus of vehicle A, all the steering apparatuses of vehicle B and vehicle A are operated in the counterclockwise direction if an existing steering torque apparatus is used so that vehicle B may be in danger.

Differently, if vehicle C uses the steering torque apparatus according to the present invention, the distance change rate of the steering torque apparatus according to the present invention is calculated as being a positive number and it is determined that vehicle C moves rearwards, so that vehicle C is prevented from crossing the line by operating the steering apparatus of vehicle C in the clockwise direction 230 that is an opposite direction of the direction of a target torque.

Figure 3:
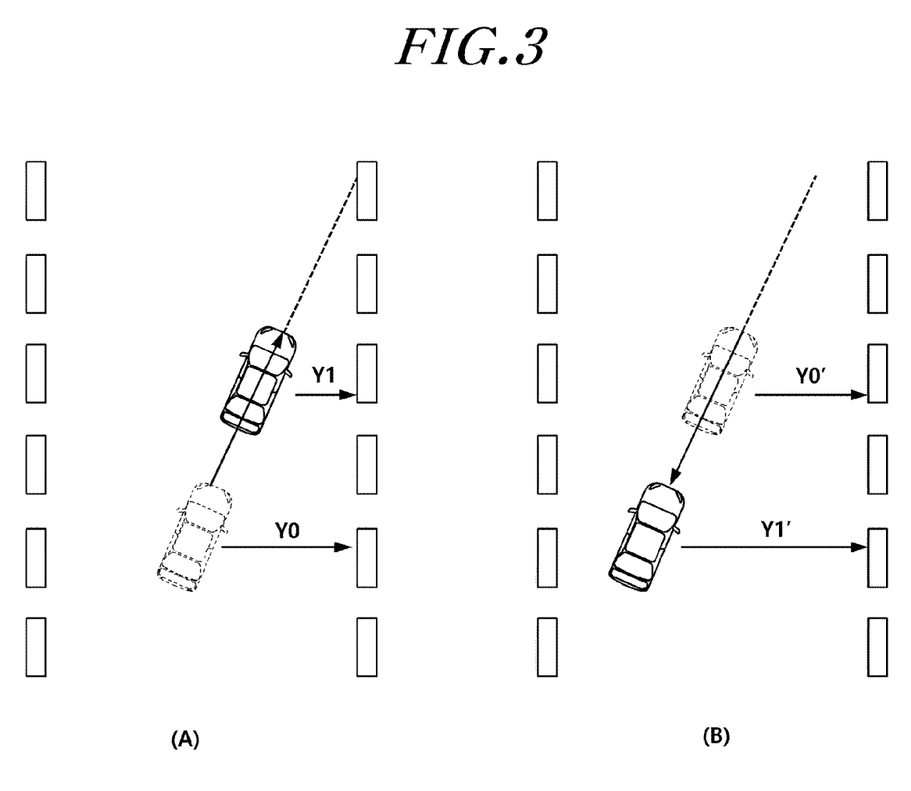
FIG. 3 is a view illustrating an example for explaining an operation of an operation determination unit according to the present invention.

FIG. 3 is a view illustrating an example for explaining an operation of an operation determination unit according to the present invention.

The steering torque compensating apparatus according to the present invention may calculate a distance change rate that is a change rate of a distance difference per time, and may determine that the vehicle is driven forwards if the distance change rate is calculated as being a negative value and determine that the vehicle is driven rearwards if the distance change rate is calculated as being a positive value.

Referring to FIG. 3, all the front sides of vehicle A and vehicle B head toward the right line of the lane, and the vehicles move while the angle between the forward direction and the line of the lane is not changed. However, vehicle A moves forwards for a predetermined time period to have a distance difference of Y1 at time t1 in a situation where it has a distance difference of Y0 at time t0, while vehicle B moves rearwards for a predetermined time period to have a distance difference of Y1' at time t1' in a situation where it has a distance difference of Y0' at time t0'. Distance change rates may be calculated for vehicle A and vehicle B by using Equation 1, and may be expressed as in Equation 2 and Equation 3. The distance change rate of vehicle A is a negative number so that the operation determination unit may determine that vehicle A moves forwards, and the distance change rate of vehicle B is a positive number so that the operation determination unit may determine that vehicle B moves rearwards.

$$\frac{dY}{dt} = \frac{Y_1 - Y_0}{t_1 - t_0} < 0 \qquad \text{Equation 2}$$

$$\frac{dY}{dt} = \frac{Y_1' - Y_0'}{t_1' - t_0'} > 0 \qquad \text{Equation 3}$$

Figure 4:
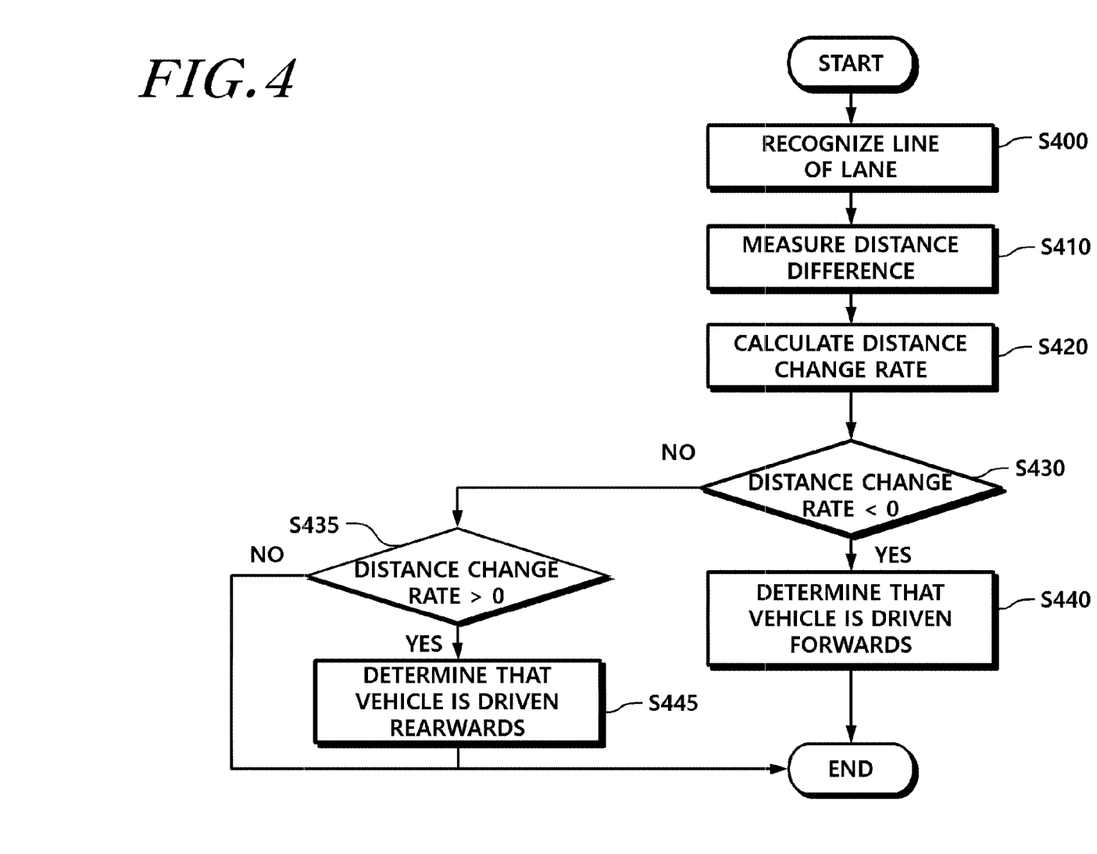
FIG. 4 is a flowchart illustrating an operation of a steering torque compensating apparatus according to another embodiment of the present invention.

FIG. 4 is a flowchart illustrating an operation of a steering torque compensating apparatus according to another embodiment of the present invention.

The steering torque compensating apparatus according to the present invention may calculate a distance change rate that is a change rate of a distance difference per time, and may determine that the vehicle is driven forwards if the distance change rate is calculated as being a negative value and determine that the vehicle is driven rearwards if the distance change rate is calculated as being a positive value.

Referring to FIG. 4, it is briefly described again that the lane recognition unit of the steering torque compensating apparatus according to the present invention recognizes lines of a lane (S400). The lane recognition unit may recognize the lines by using a camera of the vehicle. Briefly, the lines of a lane may be recognized by inputting colors of lines and the length information of the widths of the lines to a camera unit in advance, by measuring an object or a pattern having a color by the camera unit, by comparing the measured colors and widths with the information on the colors and widths of the lines that are input in advance, and by identifying whether they coincide with each other to recognize the lines of the lane.

Thereafter, the distance measurement unit measures a distance difference between the recognized line and the vehicle (S410). The distance difference may mean the shortest distance between the line of the lane and the vehicle. Next, the operation determination unit calculates a distance change rate by using Equation 1 (S420). If the calculation of the distance change rate is finished, the operation determination unit determines whether the distance change rate is a negative value (S430). If it is determined that the distance change rate is a negative value, the operation determination unit determines that the vehicle is driven forwards and then ends the determination (S440). If it is determined in step S430 that the distance change rate is not a negative value, the operation determination unit determines whether the distance change rate is a positive value (S435). If it is determined that the distance change rate is a positive value, the operation determination unit determines that the vehicle is driven rearwards and then ends the determination (S445). If it is determined that the distance change rate is not a positive value in step S435, that is, if the distance change rate is calculated as being zero, the operation determination unit does not determine whether the vehicle is driven forwards or rearwards and may perform steps S400 to S445 again.

Figure 5:
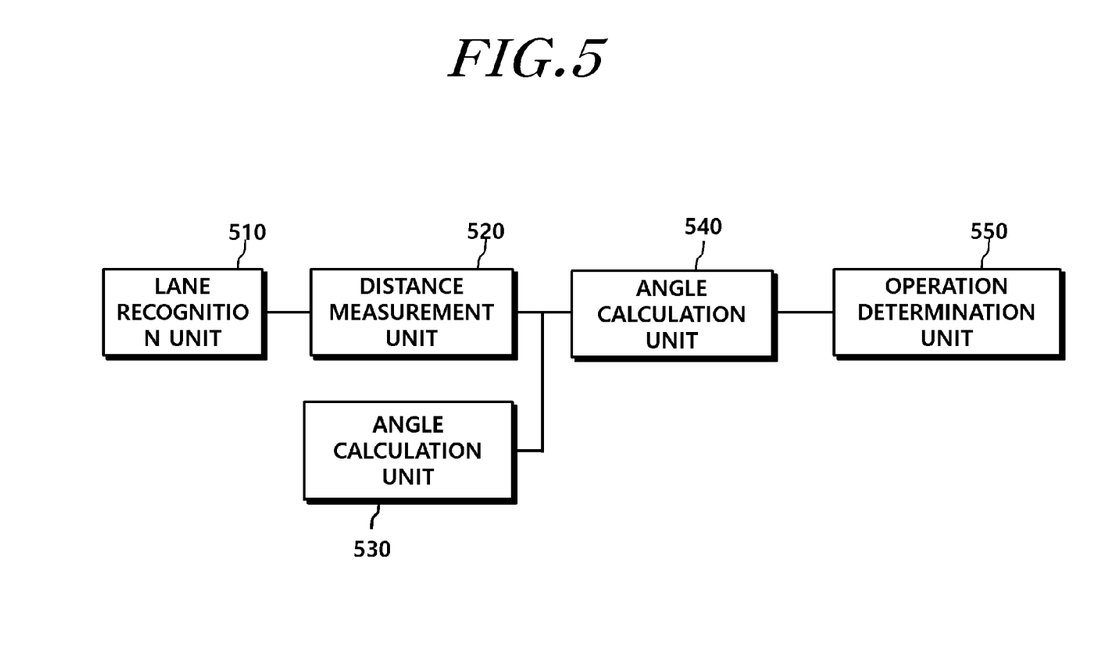
FIG. 5 is a block diagram illustrating a configuration of a steering torque compensating apparatus according to another embodiment of the present invention.

FIG. 5 is a block diagram illustrating a configuration of a steering torque compensating apparatus according to another embodiment of the present invention.

The steering torque compensating apparatus according to the present invention further includes a speed measurement unit that measures longitudinal speed by using a speed sensor of the vehicle and an angle calculation unit that calculates the forward direction of the vehicle and a line of a lane, and When the magnitude of the distance change rate corresponds to a product, within a preset error range, of a longitudinal speed and an angle, the operation determination unit may determine whether the vehicle is driven forwards or rearwards by using the distance change rate.

Referring to FIG. 5, the lane recognition unit 510 and the distance measurement unit 520 perform the same operations as those of the lane recognition unit and the distance measurement unit of FIG. 1, and the steering torque compensating apparatus of the embodiment of the present invention further includes a speed measurement unit 530 that measures longitudinal speed by using a speed sensor of the vehicle and an angle calculation unit 540 that calculates an angle between the forward direction of the vehicle and a line of a lane, and includes an operation determination unit 550 that additionally has a function of determining whether the magnitude of a distance change rate corresponds to a product, within a preset error range, of a longitudinal speed and an angle while performing the functions of the operation determination unit of FIG. 1.

However, the longitudinal speed measured by the speed measurement unit 530 corresponds to speed information measured from a mass-produced vehicle, and is expressed only by a positive number so that the longitudinal speed information does not contain information on the forward or rearward movement of the vehicle.

The angle calculation unit 540 may calculate an angle [θ] between the forward direction of the vehicle and a line of a lane. Briefly, a longitudinal movement distance L by which the vehicle moves for a time period of t1 to t0 may be calculated by using longitudinal speed, and a change rate dY of the distance differences may be obtained by subtracting a distance difference Y0 at time t0 from a distance difference Y1 at time t1. The longitudinal movement distance [L], the change rate of distance differences [dY], and the angle [θ] have a relationship as in Equation 4.

$$\sin\theta = \frac{dY}{L} \qquad \text{Equation 4}$$

Accordingly, the angle [θ] may be obtained in Equation 5 by using the relationship of Equation 4.

$$\theta = \sin^{-1}\frac{dY}{L} \qquad \text{Equation 5}$$

When the magnitude of the distance change rate corresponds to a product, within a preset error range, of a longitudinal speed and an angle, the operation determination unit 550 may determine whether the vehicle is driven forwards or rearwards. In detail, the magnitude [dY/dt] of a distance change rate, a longitudinal speed [V], and an angle [θ] have the relationships of Equations 6 and 7.

$$\left|\frac{dY}{dt}\right| \simeq \frac{dL\theta}{dt} \qquad \text{Equation 6}$$

$$\frac{d(L\theta)}{dt} = V\theta \qquad \text{Equation 7}$$

Figure 6:
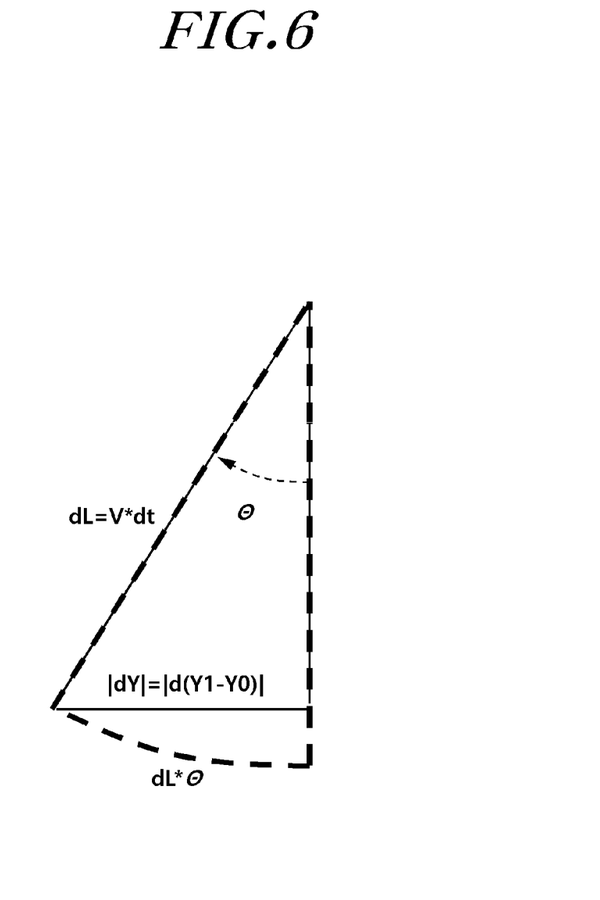
FIG. 6 is a view illustrating a relationship between an angle, a longitudinal speed, and a distance difference in another embodiment of the present invention.

FIG. 6 is referred for a detailed description of Equation 6.

FIG. 6 is a view illustrating a relationship between an angle, a longitudinal speed, and a distance difference in another embodiment of the present invention.

Referring to FIG. 6, the longitudinal movement distance [dL] is a distance by which the vehicle moves at a longitudinal speed between time t0 and time t1 that is a time [dt] after time t0, and the magnitude [dY] of the change value of the distance differences is obtained by subtracting a distance difference [Y0] at time t0 from a distance difference [Y1] at time t1. The length of an arc by the longitudinal movement distance and the angle may be expressed by a product of the longitudinal movement distance and the angle. Here, the angle is a radian value. Furthermore, as can be seen from the relationship of Equation 4, the longitudinal movement distance [dL] and the magnitude [dY] of the change value of the distance difference have a sinusoidal function relationship for the angle θ. As can be seen from FIG. 6, the length dL*θ of an arc has a value larger than the magnitude [|dY|] of the change value of the distance difference but the length dL*θ of the arc, and the change value [|dY|] are approximately similar to each other because they correspond to infinitesimal values and are very small and may be expressed in Equation 6. Furthermore, dL/dt is as in Equation 7 because it means a longitudinal speed, and Equation 8 may be calculated by using Equations 6 and 7.

$$\left|\frac{dY}{dt}\right| \simeq V\theta \qquad \text{Equation 8}$$

Returning to FIG. 5, if the magnitude of the distance change rate corresponds to a product, within a preset error range, of a longitudinal speed and an angle in the relationship of Equation 8, the operation determination unit 550 may identify that an error does not exist in the calculation of the distance change rate, and it may be accurately determined whether the vehicle is driven forwards or rearwards by applying the identified distance change rate. As can be seen from Equation 8, the preset error range may be a value in which an approximation is reflected because the magnitude of the distance change rate and V*θ are approximately the same.

Figure 7:
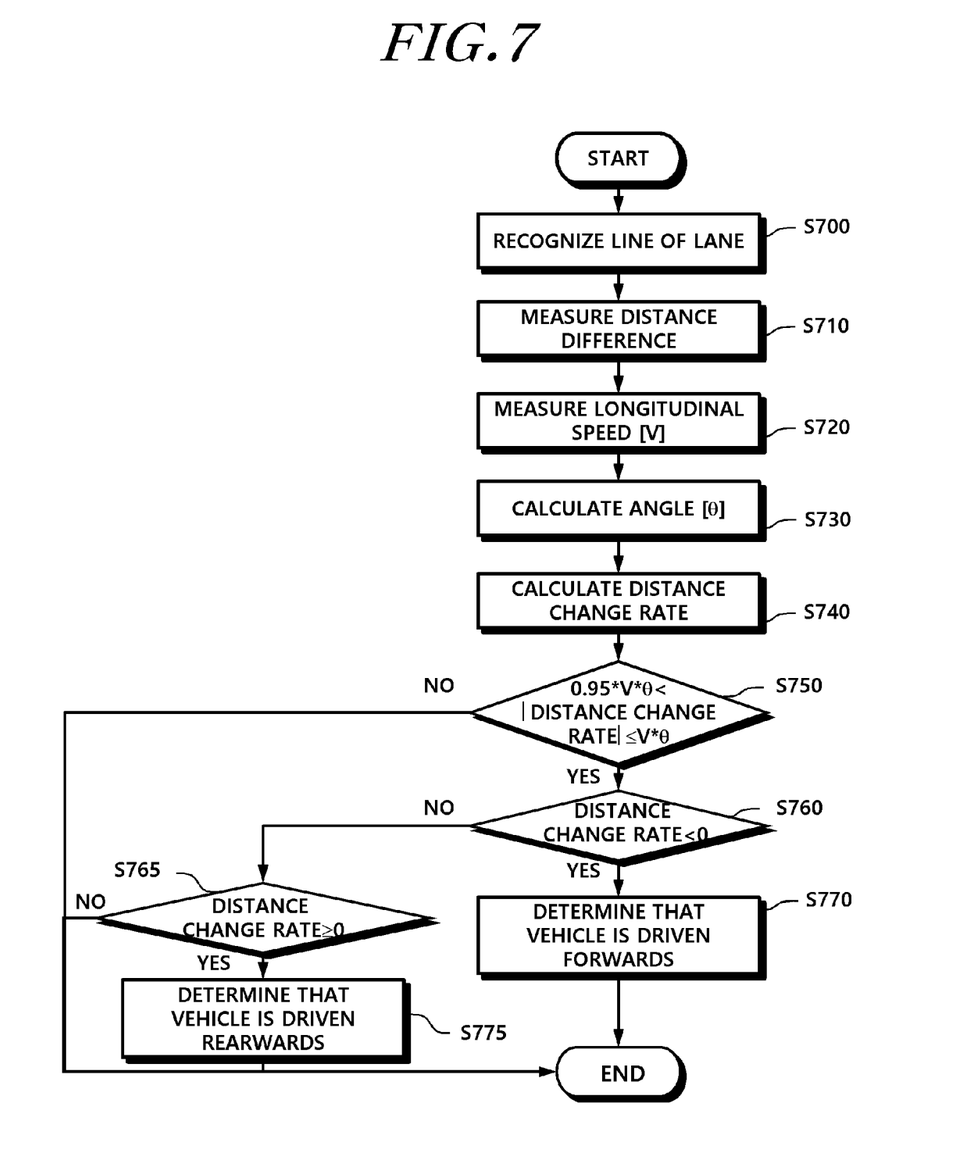
FIG. 7 is a flowchart illustrating an operation of a steering torque compensating apparatus according to another embodiment of the present invention.

FIG. 7 is a flowchart illustrating an operation of a steering torque compensating apparatus according to another embodiment of the present invention.

The lane recognition unit recognizes a line of a lane (S700). Briefly, the line is recognized by using a camera of the vehicle, and may be recognized by inputting information (for example, the color of the line and the width of the line) of the line in advance and comparing it with an object or pattern photographed by the camera and information of the line.

The distance measurement unit measures a distance difference between the recognized line and the vehicle (S710). That is, one of the opposite lines of a lane is determined as a reference road line corresponding to a fixed reference object on the basis of the heading angle of the vehicle, and a distance difference between the line and the vehicle is measured. The distance difference means the shortest distance between the line and the vehicle, and the shortest distance means the shortest distance between point A and a straight line when the line of the lane is regarded as the straight line and the vehicle is regarded as a point A.

The speed measurement unit measures a longitudinal speed of the vehicle (S720). The longitudinal speed is a value measured in a mass-produced vehicle, and is physically a speed concept because it is expressed by a positive number. Accordingly, it cannot be determined whether the vehicle moves forwards or rearwards, according to the longitudinal speed.

The angle calculation unit calculates an angle between the forward direction of the vehicle and the angle of the line of the lane (S730). The angle may be obtained by using Equation 5. If the line of the lane is curved, a line that is tangential to the line is obtained and an angle for the tangential line may be calculated.

The operation determination unit calculates a distance change rate that is a change rate of the distance difference per time (S740). The distance change rate may be obtained by applying Equation 1. The operation determination unit determines whether an error exists in the calculation of the distance change rate by identifying whether the magnitude of the calculated distance change rate is a product, in a preset accuracy range, of a longitudinal speed and an angle (S750). Because the relationship between the distance change rate, the longitudinal speed, and the angle has the relationships of Equations 6 to 8, the product of the longitudinal speed and the angle may coincide with the distance change rate at a high accuracy. Step S750 is an example in which a preset accuracy is 0.95, and the accuracy may be determined on the basis of experimental data.

If the magnitude of the distance change rate is a product, outside the preset accuracy, of a longitudinal speed and an angle (for example, the distance change rate is a value equal to or less than 0.95*the longitudinal speed*the angle) in step S750, the operation determination unit does not determine the operation of the vehicle and ends the determination. Differently, if it is determined that an error does not exist in the distance change rate in step S750, the operation determination unit determines whether the distance change rate is a negative value (S760). If it is determined in step 760 that the distance change rate is a negative value, the operation determination unit determines that the vehicle is driven forwards and then ends the determination (S770). If it is determined in step S760 that the distance change rate is not a negative value, the operation determination unit determines whether the distance change rate is a positive value (S765). If it is determined in step S765 that the distance change rate is a positive value, the operation determination unit determines that the vehicle is driven rearwards and then ends the determination (S775). If it is determined in step S765 that the distance change rate is not a positive value, the operation determination unit does not determine whether the vehicle is driven and ends the determination.

The steering torque compensating apparatus according to the present invention may perform the processes of steps S700 to S740, the processes of step S700 to S750, or the processes of steps S700 to S765 by a preset number of times, and then may perform steps S770 and S775. Accordingly, when one or more errors exist in steps S700 to S765, a wrong determination of the operation determination unit may be prevented.

Furthermore, if the operation determination unit determines the operation of the vehicle and the longitudinal speed measured in step S720 is zero, the operation determination unit determines the operation of the vehicle again. Accordingly, the number of times of the processes of steps S700 to S765 may be optimally limited.

The steering torque compensating apparatus according to the present invention may further include a controller that controls assistance steering torque. The controller may set an assistance steering torque to a target torque if it is determined that the vehicle is driven forwards, and may set the magnitude of the assistance steering torque to the magnitude of the target torque and set the direction of the assistance steering torque to a direction opposite to the direction of the target torque if it is determined that the vehicle is driven rearwards.

The target torque is a steering assisting torque that makes the forward direction of the vehicle parallel to the line of the lane without considering whether the vehicle is driven forwards or rearwards. That is, if the front side of the vehicle heads to the right line, the target torque allows the steering wheel of the vehicle to be operated counterclockwise, but if the front side of the vehicle heads to the left line, it allows the steering wheel to be operated clockwise.

Referring to FIG. 2, if the controller controls the vehicle that is driven forwards with the same assistance steering torque the magnitude and direction of which are the same as those of the target torque as is the case of vehicle A, the vehicle can be prevented from crossing the right line, which is safe. Meanwhile, if the vehicle that is driven rearwards is controlled with the same assistance steering torque, the magnitude and direction of which are the same as those of the target torque as is the case of vehicle B, it may cross the left line, which may cause danger. Accordingly, if the vehicle that is driven rearwards is controlled with an assistance steering torque having the same magnitude as that of the target torque and a direction opposite to the direction of the target torque as is the case of vehicle C, the vehicle can be prevented from crossing the left line, which is safe.

Hereinafter, a steering torque compensating method that corresponds to an operation of the steering torque compensating apparatus that has been described with reference to FIGS. 1 to 7 will be briefly described.

Figure 8:
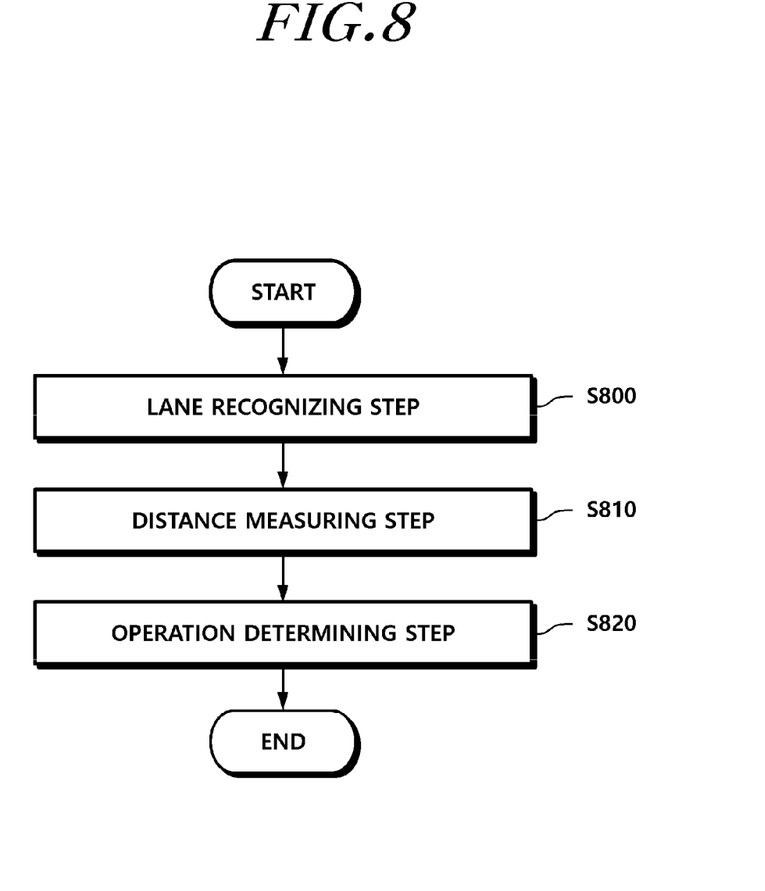
FIG. 8 is a flowchart illustrating a steering torque compensating method according to another embodiment of the present invention.

FIG. 8 is a flowchart illustrating a steering torque compensating method according to an embodiment of the present invention.

The steering torque compensating method according to the present invention includes a lane recognizing step of recognizing a line of a lane using a camera of the vehicle, a distance measuring step of measuring a distance difference between the vehicle and the line, and an operation determining step of calculating a distance change rate that is a change rate of the distance difference per time and determining whether the vehicle is driven forwards or rearwards by using the distance change rate.

The steering torque compensating method may include a lane recognizing step of recognizing a line of a lane by using a camera of the vehicle (S800). In the lane recognizing step, a line of a lane may be recognized by inputting information of lines (for example, the colors and widths of the lines) in advance and comparing the information with an object photographed by the camera or information of the lines input in advance. In the comparison method, for example, if the colors and widths are expressed by numbers, the information of the lines input in advance as well as the object or pattern photographed by the camera have specific numbers. The line of the lane may be recognized by comparing the numbers. For example, if it is assumed that the number of the information of the line input in advance is 50 and the numbers of five objects or patterns photographed by the camera is 20, 35, 45, 50, and 60, respectively, the object or pattern corresponding to the number of 50 may be recognized as the line of the lane. Here, if it is preset that the error of 0.1 is allowed, the object or pattern corresponding to 45 and 50 may be recognized as the line of the lane.

The steering torque compensating method may include a distance measuring step of measuring a distance difference between the recognized line and the vehicle (S810). In the distance measuring step, the shortest distance between the recognized line and the vehicle is measured. Briefly, a distance value of the line may be measured by comparing object A, the distance value of which is already known, with the recognized line. When one camera is used for the measurement, it may measure object A and the line only when they exist in the same one-dimension or two-dimension. When the camera, object A, and the line exist three-dimensionally, an apparatus capable of recognizing two cameras or one camera and an object may be used.

The steering torque compensating method may include an operation determining step of calculating a distance change rate that is a change rate of the distance difference per time and determining whether the vehicle is driven forwards or rearwards by determining whether the calculated value of the distance change rate is a positive number or a negative number (S820). Briefly, the distance change rate is calculated by using Equation 1, and it is determined that the vehicle is driven forwards or rearwards if the calculated distance change rage is a negative number of a positive number.

It is determined that the vehicle is driven forwards if the distance change rate is a negative number and it is determined that the vehicle is driven rearwards if the distance change rate is a positive number because the distance difference used to calculate the distance change rate is defined as being a minimum distance value between the line which the front side of the vehicle heads to and the vehicle. Accordingly, if the distance change rate is calculated with the definition that the distance difference is a minimum distance value between the line which the rear side of the vehicle heads to and the vehicle, it may be determined that the vehicle is driven rearwards or forwards if the calculated distance change rate is a negative number of a positive number, so that the relationship in which the vehicle is driven forwards if the distance change rate is a negative number and the vehicle is driven rearwards if the distance change rate is a positive number is not established.

Although only a straight line of a lane has been described until now, the present invention may also be applied to a curved line in the same way in consideration of an infinitesimal time on the curved line, so the present invention is not applied only to a straight line.

In addition, in the steering torque compensating method according to the present invention, all the operations performed by the steering torque compensating apparatus according to the present invention, which has been described with reference to FIGS. 1 to 7, may be performed.

According to the present invention, in autonomous driving, automatic parking, and a lane keeping assist system in which a steering apparatus of the vehicle is automatically driven regardless of the steering intention of the driver, a safe steering control is possible by identifying whether the vehicle is driven forwards or rearwards and generating an auxiliary steering force according to the identification.

Even if it was described above that all of the components of an embodiment of the present invention are coupled as a single unit or coupled to be operated as a single unit, the present invention is not necessarily limited to such an embodiment. That is, at least two elements of all structural elements may be selectively joined and operate without departing from the scope of the present invention. Although a preferred embodiment of the present invention has been described for illustrative purposes, those skilled in the art will appreciate that various modifications, additions and substitutions are possible, without departing from the scope and spirit of the invention as disclosed in the accompanying claims. The scope of the present invention shall be construed on the basis of the accompanying claims in such a manner that all of the technical ideas included within the scope equivalent to the claims belong to the present invention.

What is claimed is:

1. A steering torque compensating apparatus, comprising:
    a reference object recognition unit that recognizes a fixed reference object arranged in correspondence to a lane of a road by using a camera of a vehicle;
    a distance measurement unit that measures a distance difference between the vehicle and the fixed reference object;
    an operation determination unit that calculates a distance change rate that is a change rate of the distance difference per time and determines whether the vehicle is driven forwards or rearwards, by using the distance change rate; and
    a controller that controls an assistance steering torque, wherein the controller
        sets the assistance steering torque to a target torque when it is determined that the vehicle is driven forwards,
        sets magnitude of the assistance steering torque to magnitude of the target torque, and
        sets a direction of the assistance steering torque to a direction opposite to the direction of the target torque when it is determined that the vehicle is driven rearwards.

2. The steering torque compensating apparatus of claim 1, wherein the fixed reference object is one of opposite lines of the lane, and the corresponding line of the lane is determined according to a heading angle of the vehicle.

3. The steering torque compensating apparatus of claim 1, wherein the operation determination unit determines that the vehicle is driven forwards if the distance change rate is calculated as being a negative value, and determines that the vehicle is driven rearwards if the distance change rate is calculated as being a positive value.

4. The steering torque compensating apparatus of claim 1, further comprising:
    a speed calculation unit that measures a longitudinal speed by using a speed sensor of the vehicle; and
    an angle calculation unit that calculates an angle between a forward direction of the vehicle and the line of the lane,
    wherein the operation determination unit determines whether the vehicle is driven forwards or rearwards by using the distance change rate when the magnitude of the distance change rate corresponds to a product, within a preset error range, of the longitudinal speed and the angle.

5. The steering torque compensating apparatus of claim 1, wherein the operation determination unit continuously calculates a distance change rate for a predetermined time period after the vehicle is driven forwards or rearwards.

6. The steering torque compensating apparatus of claim 1, further comprising:
    a speed calculation unit that measures a longitudinal speed by using a speed sensor of the vehicle,
    wherein the operation determination unit determines an operation of the vehicle again if the longitudinal speed is zero.

7. The steering torque compensating apparatus of claim 1, wherein the target torque is a steering assisting torque that makes the vehicle parallel to the line of the lane.

8. A steering torque compensating method, comprising:
    recognizing a fixed reference object arranged in correspondence to a lane of a road by using a camera of a vehicle;
    measuring a distance difference between the vehicle and the fixed reference object;
    calculating a distance change rate that is a change rate of the distance difference per time and determining whether the vehicle is driven forwards or rearwards, by using the distance change rate;
    setting an assistance steering torque to a target torque when it is determined that the vehicle is driven forwards, and setting a magnitude of the assistance steering torque to magnitude of the target torque; and
    setting a direction of the assistance steering torque to a direction opposite to the direction of the target torque when it is determined that the vehicle is driven rearwards.

9. The steering torque compensating method of claim 8, wherein the fixed reference object is one of opposite lines of the lane, and the corresponding line of the lane is determined according to a heading angle of the vehicle.

* * * * *